United States Patent
Li et al.

(10) Patent No.: US 12,254,079 B2
(45) Date of Patent: Mar. 18, 2025

(54) PROVIDING SYSTEM SERVICES

(71) Applicant: INTERNATIONAL BUSINESS MACHINES CORPORATION, Armonk, NY (US)

(72) Inventors: Naijie Li, Beijing (CN); Min Cheng, Beijing (CN); Kui Zhang, TianJin (CN); Yi Chai, Beijing (CN); Guang Han Sui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 17/662,710

(22) Filed: May 10, 2022

(65) Prior Publication Data
US 2023/0367869 A1 Nov. 16, 2023

(51) Int. Cl.
*G06F 12/14* (2006.01)
*G06F 9/54* (2006.01)
(Continued)

(52) U.S. Cl.
CPC .............. *G06F 21/51* (2013.01); *G06F 9/545* (2013.01); *G06F 12/14* (2013.01); *G06F 21/53* (2013.01); *G06F 2212/1052* (2013.01)

(58) Field of Classification Search
CPC .......... G06F 21/51; G06F 9/545; G06F 12/14; G06F 21/53; G06F 2212/1052; G06F 12/1441; G06F 12/1491
See application file for complete search history.

(56) References Cited

U.S. PATENT DOCUMENTS 4,943,913 A 7/1990 Clark
9,524,154 B2 * 12/2016 Jawa ................. H04L 63/20
(Continued)

FOREIGN PATENT DOCUMENTS

CN 100501681 C 6/2009
CN 103080871 A 5/2013
(Continued)

OTHER PUBLICATIONS

"What is the difference between system call and library call?" Stack Overflow. Published 2015. < https://stackoverflow.com/questions/29816791/what-is-the-difference-between-system-call-and-library-call>. Retrieved 2024. (Year: 2015).*
(Continued)

*Primary Examiner* — Kenneth M Lo
*Assistant Examiner* — Hewy H Li
(74) *Attorney, Agent, or Firm* — Stephen R. Yoder (57) ABSTRACT

Embodiments of the present disclosure relate to a method, system and computer program product for providing system services. In some embodiments, a method is disclosed. According to the method, from a user program in a user address space, a request for a system service is received via a program call instruction of a set of program call instructions in an application interface code library. Based on the program call instruction, a target authorized address space of a plurality of authorized address spaces and a target system service routine for providing the system service in the target authorized address space is determined. A result of running the target system service routine in the target authorized address space is returned to the user program as a response to the request.

20 Claims, 6 Drawing Sheets

(51) Int. Cl.
    *G06F 21/51*     (2013.01)
    *G06F 21/53*     (2013.01)

(56) References Cited

U.S. PATENT DOCUMENTS

| | | |
|---|---|---|
| 2007/0050848 A1 | 3/2007 | Khalid |
| 2007/0288941 A1 | 12/2007 | Dunshea |
| 2012/0054877 A1 | 3/2012 | Rosu |
| 2019/0324924 A1 | 10/2019 | Miller |
| 2020/0104507 A1* | 4/2020 | Kasper .................. G06F 21/577 |
| 2020/0104508 A1 | 4/2020 | Childs |
| 2020/0364101 A1* | 11/2020 | Bottomley .............. G06F 9/545 |
| 2023/0092214 A1* | 3/2023 | Wu ......................... G06F 9/545 718/1 |

FOREIGN PATENT DOCUMENTS

| | | |
|---|---|---|
| CN | 112231248 A | 1/2021 |
| JP | 2002189633 A | 7/2002 |

OTHER PUBLICATIONS

Arora, Himanshu. "What is Linux System Calls and Library Functions?" The Geek Stuff. Published Jul. 4, 2012. < https://www.thegeekstuff.com/2012/07/system-calls-library-functions/>. (Year: 2012).*

"Synchronous Cross Memory Communication", IBM Documentation, Downloaded from the Internet on Sep. 22, 2021, 2 pgs., <https://www.IBM.com/docs/en/zos/2.1.0?topic=guide-synchronous-cross-memory-communication>.

Hiltunen, et al., "System Call Monitoring Using Authenticated System Calls", IEEE Transactions on Dependable and Secure Computing, vol. 3, No. 3, Aug. 2006, 15 pgs., DOI: 10.1109/TDSC.2006.41.

Mell et al., "The NIST Definition of Cloud Computing", National Institute of Standards and Technology, Special Publication 800-145, Sep. 2011, 7 pages.

Reading and Writing Data from or to User Space, Oracle, Downloaded from the Internet on Mar. 31, 2022, Copyright © 2014, 2021, Oracle and/or its affiliates, 1 pg., <https://docs.oracle.com/en/operating-systems/oracle-linux/6/porting/section_ohm_jhk_tm.html>.

Skarlatos, et al., "Draco: Architectural and Operating System Support for System Call Security" 2020 53rd Annual IEEE/ACM International Symposium on Microarchitecture (MICRO), Oct. 2020, 16 pgs., doi: 10.1109/MICRO50266.2020.00017.

"Patent Cooperation Treaty PCT Notification of Transmittal of the International Search Report and the Written Opinion of the International Searching Authority, or the Declaration", Applicant's file reference F23W3926, International application No. PCT/CN2023/086386, International filing date Apr. 6, 2023, Date of Mailing Jun. 23, 2023, 8 pages.

\* cited by examiner

PROVIDING SYSTEM SERVICES

BACKGROUND

The present disclosure relates to computer science, and more specifically, to a method, system, and computer program product for providing system services.

In a computer system, the user space allocated for user programs is separated from the kernel space allocated for the kernel of the operating system. A user program running in the user space can issue a system call to request a system service from the kernel. For example, the user program may request, via a system call wrapper function in the GNU C library (glibc), the system service provided in the kernel space. However, with the system call, a malicious user program may launch an attack on the kernel and the security of the kernel may be compromised.

SUMMARY

According to one embodiment of the present disclosure, there is provided a computer-implemented method. According to the method, one or more processors receive from a user program in a user address space, a request for a system service via a program call instruction of a set of program call instructions in an application interface code library for the user address space. The one or more processors determine, based on the program call instruction, a target authorized address space of a plurality of authorized address spaces and a target system service routine for providing the system service in the target authorized address space. The one or more processors run the target system service routine in the target authorized address space. The one or more processors return a result of running the target system service routine to the user program as a response to the request.

According to another embodiment of the present disclosure, there is provided a system. The system comprises a processing unit and a memory coupled to the processing unit. The memory stores instructions that, when executed by the processing unit, perform actions comprising: receiving, from a user program in a user address space, a request for a system service via a program call instruction of a set of program call instructions in an application interface code library for the user address space; determining, based on the program call instruction, a target authorized address space of a plurality of authorized address spaces and a target system service routine for providing the system service in the target authorized address space; running, the target system service routine in the target authorized address space; and returning, a result of running the target system service routine to the user program as a response to the request.

According to yet another embodiment of the present disclosure, there is provided a computer program product. The computer program product is tangibly stored on non-transient machine-readable medium and comprises machine-executable instructions. The machine-executable instructions, when executed on a device, cause the device to perform actions comprising: receiving, from a user program in a user address space, a request for a system service via a program call instruction of a set of program call instructions in an application interface code library for the user address space; determining, based on the program call instruction, a target authorized address space of a plurality of authorized address spaces and a target system service routine for providing the system service in the target authorized address space; running, the target system service routine in the target authorized address space; and returning, a result of running the target system service routine to the user program as a response to the request.

In this way, the target authorized address space can provide the system services requested by the user program in the user address space with high efficiency, compatibility and security. For example, even if the request is issued by a malicious user program, only the target authorized address space would be affected while the security of other authorized address spaces can be maintained. Moreover, by using the program call instruction in the application interface code library to invoke the system service routine, the high efficiency and compatibility can be achieved.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
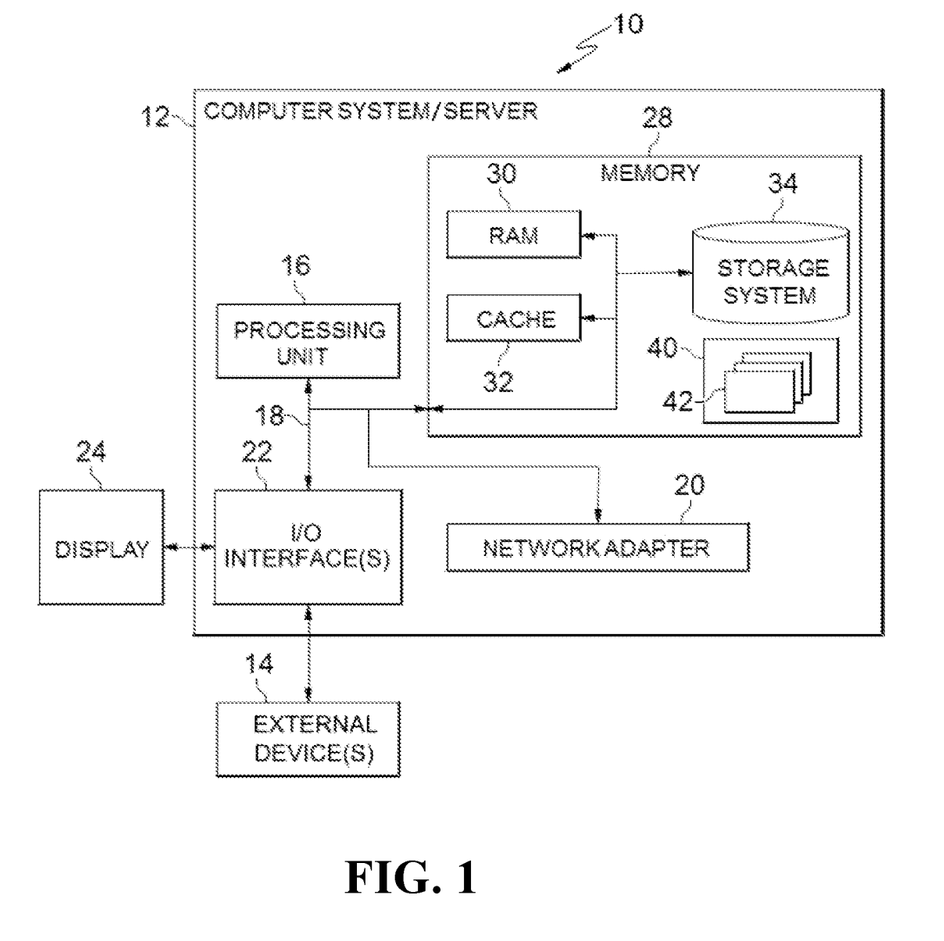
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
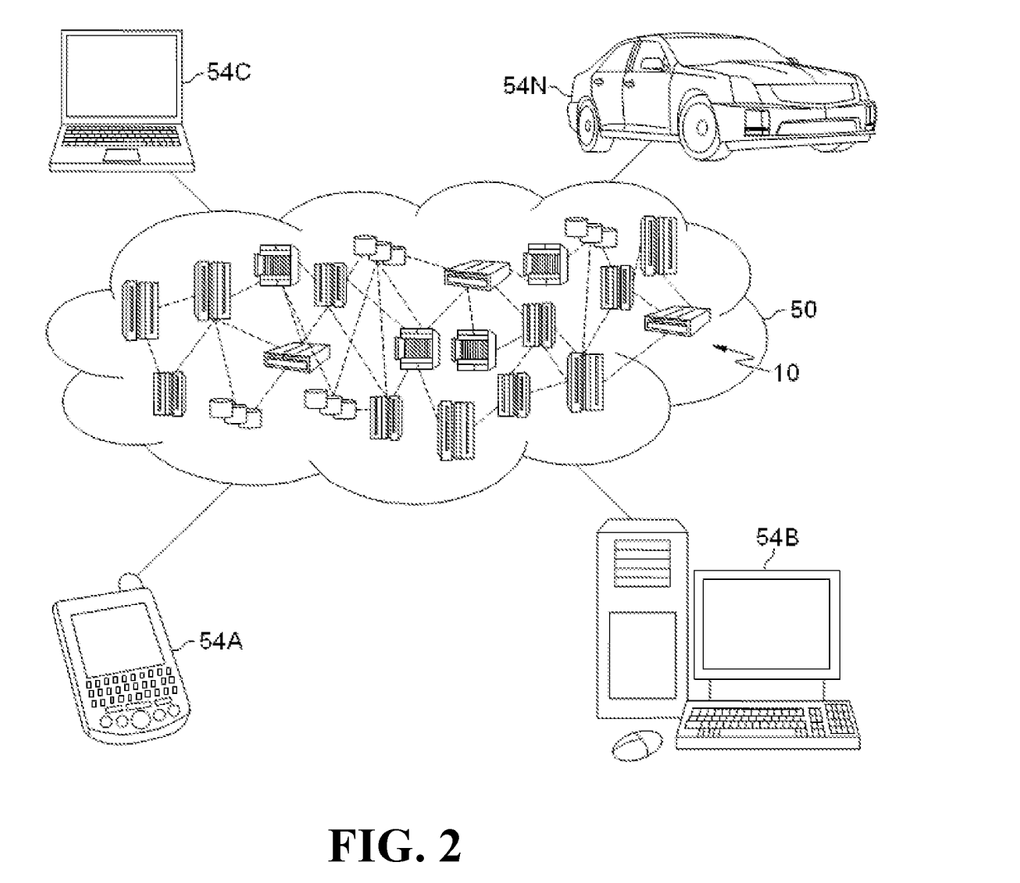
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
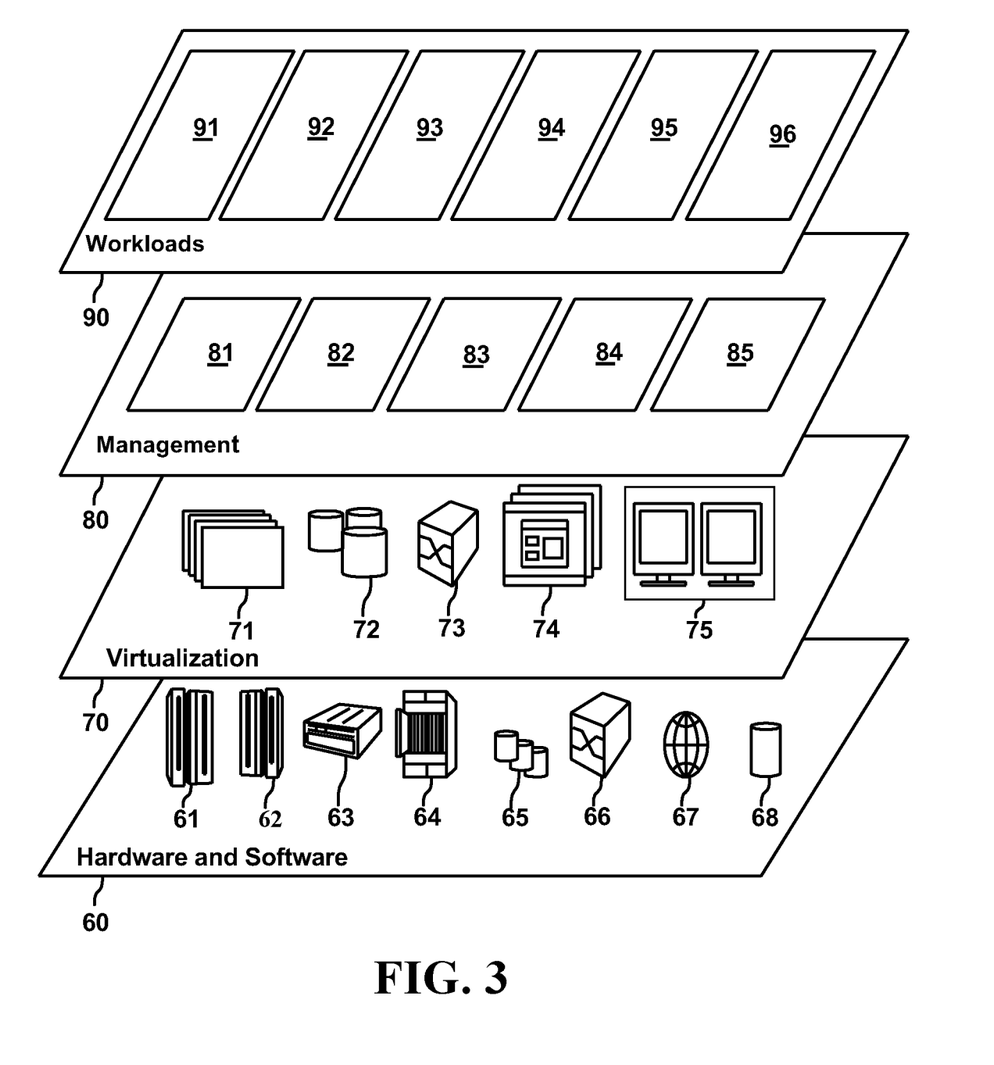
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system services providing 96. Hereinafter, reference will be made to FIG. 4-6 to describe details of the system services providing 96.

As described above, with the system calls, malicious user programs may launch attacks on the kernel and the security of the kernel may be compromised. A few of solutions have been proposed to improve the security of the kernel.

Linux namespace is commonly used to provide a lot of types of resource isolation. However, there are still some key contents which cannot be isolated completely, such as critical directories in some systems.

Based on the Linux kernel namespace, Docker is proposed as an open source containerization platform enabling developers to package applications into containers for resource isolation. The containers are isolated from one another and bundle their own software, libraries and configuration files. However, all of the containers share the system services of the kernel (also referred to as the host kernel), and thus the malicious user program in a container can use some special means to cause the host kernel crash, which in turn can affect other containers on the host kernel.

In this case, some approaches are currently proposed to make the containers run on top of their own virtual kernel and not share with each other. For example, Micro-virtual machine (VM) based containers, such as Kata containers, each runs in a stripped down QEMU VM and each container has its own guest kernel. However, this approach has poor performance because VMs are slower in startup speed and have lower operational efficiency compared to typical library container based container runtime which is simply a Linux user space process.

LibOS based containers, such as Nabla containers, package the LibOS with the application compilation and the application itself has its own kernel. However, in this approach, the container image has to be specifically built for it because the code needs to be compiled to use the LibOS functions instead of the standard libc that makes use of system calls. Thus this approach has poor compatibility.

Process virtualization based containers, such as gVisor, implement a "kernel process" outside the kernel to capture and act as an agent of system calls of the application and isolate non-safe system calls, thereby improving the security of the kernel. However, the approach has poor performance because the proxy and filtering mechanism will significantly reduce the efficiency.

In order to at least partially solve the above and other potential problems, embodiments of the present disclosure provide a solution for providing system services. According to the solution, the user program in the user address space can request a system service via a program call instruction of a set of program call instructions in an application interface code library. Upon receipt of the request, a target authorized address space of a plurality of authorized address spaces and a target system service routine for providing the system service in the target authorized address space can be determined based on the program call instruction. Then the target system service routine is run in the target authorized address space and a result of running the target system service routine is returned to the user program as a response to the request.

In this way, the requested system service can be provided in a target authorized address space and the target authorized address space can be regarded as a designated virtual kernel space. Thus, the security of the operating system can be maintained. Moreover, by using the program call instructions in the application interface code library, the high efficiency and compatibility achieved by invoking system calls via the glibc can be maintained.

Figure 4:
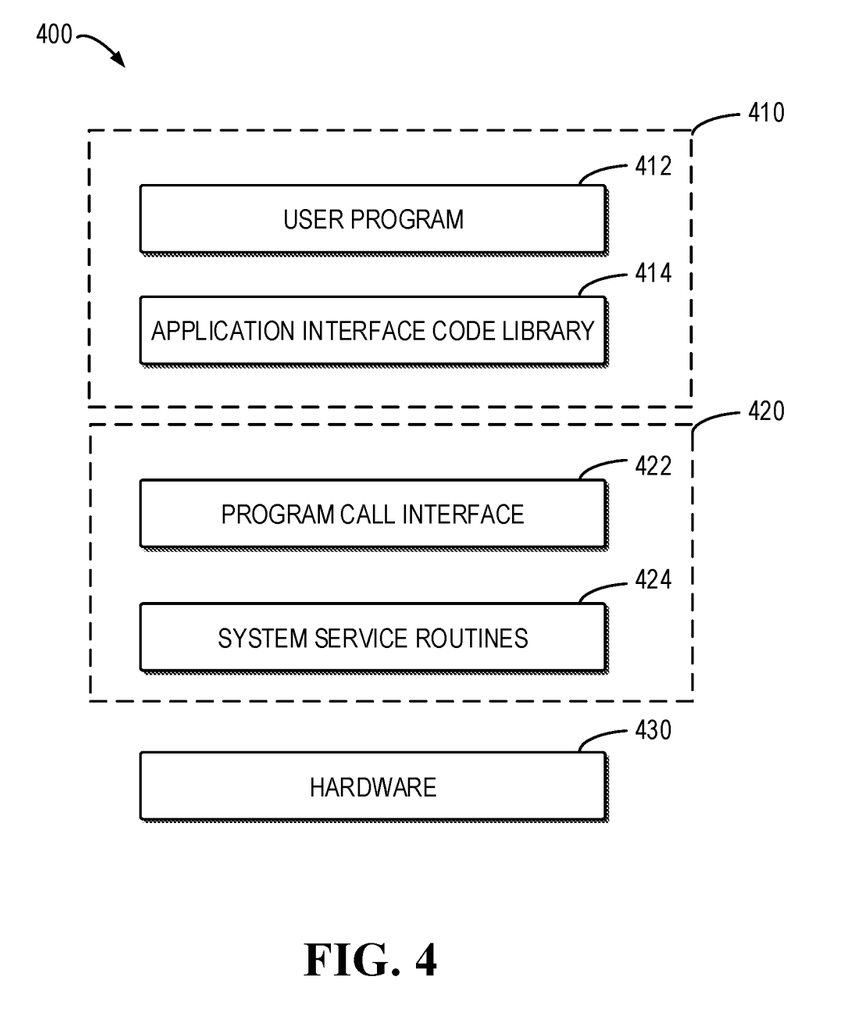
FIG. 4 depicts an example environment for providing system services according to embodiments of the present disclosure.

With reference now to FIG. 4, an example environment 400 in which embodiments of the present disclosure can be implemented is shown. It is to be understood that the elements of the environment 400 are described only for the purpose of illustration without suggesting any limitations as to the scope of the present disclosure. The embodiments of the present disclosure can be embodied with different elements. For example, at least part or all of the environment 400 may be implemented by computer system/server 12 of FIG. 1.

As shown in FIG. 4, the environment 400 may include the user address space 410, the authorized address space 420 and hardware 430. The user address space 410 may be a portion of the user space and the user address space 410 exists for running user programs. The authorized address space 420 can be regarded as a virtual kernel of the operating system and it enables interactions with the hardware 430. In the user address space 410, a user program 412 can request, via a program call instruction in an application interface code library 414 for the user address space 410, a system service from the authorized address space 420. For example, the running user program 412 may request a system service such as creating processes, doing network and file Input/Output.

The user program 412 may use the application interface code library 414 to invoke the system services. The application interface code library 414 may be a library comprising a set of program call instructions. The set of program call instructions when issued enable the system service routines 424 in the authorized address space 420 to provide system services synchronously to the user program 412 in the user address space 410. With the application interface code library 414, the user program 412 may request the system services as if they were normal functions. The details of the program call instructions and the application interface code library 414 will be described below.

Upon receipt of the program call instruction, which is a hardware command, one or more processors determine a target authorized address space corresponding to the program call instruction from a plurality of authorized address spaces in the authorized address space 420. The plurality of authorized address spaces may be a portion of the authorized address space 420.

The one or more processors further determine a target system service routine for providing the requested system service in the target authorized address space based on the program call instruction. The one or more processors may determine the target system service routine from system service routines 424 in the authorized address space 420. The system service routines 424 may comprise routines for process management, memory management, file system and network system.

In some embodiments, in the target authorized address space, a program call interface (PCI) 422 may determine the target system service routine based on the program call instruction. The PCI 422 is a privileged procedure in the authorized address space, and it is a handler for the program call instruction. The PCI 422 may receive and analyze the program call instruction to determine the target system service routine based on the program call instruction. For example, the PCI 422 may determine that a sys_open routine is the target service routine requested by the user program 412.

The PCI 422 then runs the target system service routine in the target authorized address space based on interactions with the hardware 430 and returns a result of running the target system service routine to the user program 412. The result may indicate an error of running. Alternatively, the result may indicate values returned when the target system routine is completed.

Figure 5:
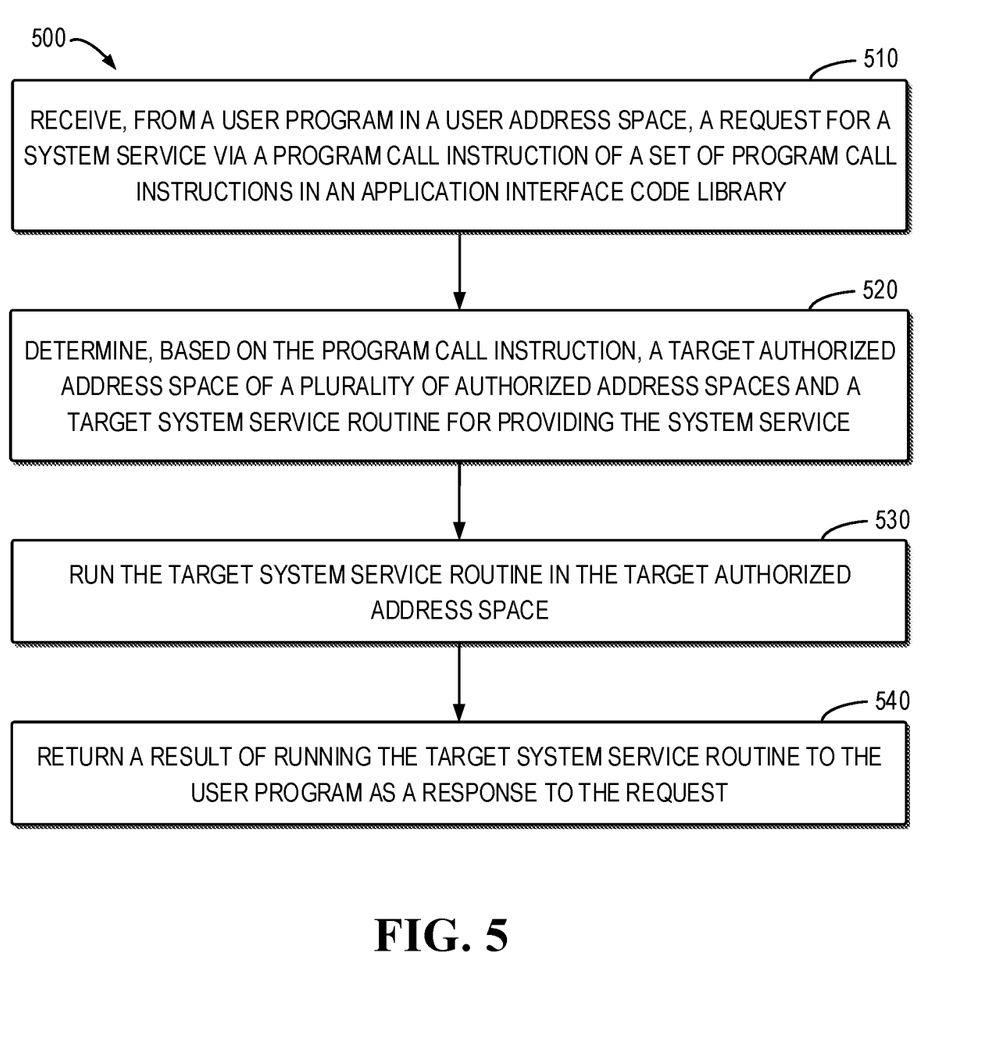
FIG. 5 depicts an example environment for providing system services to different containers according to embodiments of the present disclosure.

With reference now to FIG. 5, a flowchart of an example method 500 for providing the requested system service according to embodiments of the present disclosure is illustrated. The method 500 may be implemented in the authorized address space 420 as shown in FIG. 4. It is to be understood that the method 500 may also comprise additional blocks (not shown) and/or may omit the illustrated blocks. The scope of the present disclosure described herein is not limited in this aspect.

At block 510, the one or more processors receive, from the user program 412 in a user address space, a request for a system service via a program call instruction of a set of program call instructions in the application interface code library 414.

In some embodiments, the application interface code library 414 may be generated by replacing the system call wrapper functions encapsulated by the glibc with a set of program call instructions. The set of program call instructions may be used for invoking, in a designated authorized address space, a set of system service routines corresponding to the set of system call wrapper functions. Moreover, each of the set of program call instructions is used for invoking, in the designated authorized address space, a respective system service routine corresponding to the program call instruction.

In some embodiments, the program call instruction may be a space-switching program call instruction. In this case, the program call instruction may be used with Cross memory service (XMS) proposed for MVS and z/OS operating systems. The XMS provides a synchronous method of communications between different address spaces and the synchronous cross memory communication enables one program to provide services synchronously to other programs when the user program issues a program call instruction.

For example, the user program 412 in the user address space may issue the program call instruction to pass control to a program call routine (i.e., a system service routine herein) in the Service Provider's address space (i.e., authorized address space 420 herein). Then the program call routine provides the requested service (i.e., requested system service) or invokes other programs to provide the service, and then returns control to the user program 412.

Note that, the program call instructions and the XMS can be employed in any suitable operating systems other than the MVS and z/OS operating systems, such as Window OS, Linux OS, etc.

By using the program call instructions in the application interface code library 414, the user program 412 can request the system services without thinking about how exactly the system services are made. In this way, the solution according to the embodiments of the present disclosure can achieve high compatibility and efficiency.

At block 520, the one or more processors determine, based on the program call instruction, a target authorized address space of a plurality of authorized address spaces and a target system service routine for providing the system service in the target authorized address space.

In some embodiments, the program call instruction may comprise a first field and a second field. The first field may indicate the target authorized address space and the second field may indicate the target system service routine. For example, the first field may be bits 12-23 of the address of a specified operand of the program call instruction (also referred to as the program all number). The first field may specify a Linkage Index (LX) value. The second field may be bits 24-31 of the address of the specified operand of the program call instruction. The second field may specify an Entry Index (EX) value.

In some embodiments, the one or more processors may determine, based on a value of the first field of the program call instruction, the target authorized address space from a first table. The first table may comprise a mapping of the plurality of authorized address spaces and values of the first field. For example, the first table may be a Linkage Table proposed with the XMS and it may comprise a plurality of LX entries each corresponding to an authorized address space.

In some embodiments, the one or more processors may determine a second table based on the target authorized address space. The second table may comprise a mapping of identifiers of a plurality of system services provided in the target authorized address space and values of the second field of the program call instructions.

For example, the second table may be an Entry Table proposed with the XMS and it may describe the plurality of system services offered by the target authorized address space.

Further, the one or more processors may determine, based on a value of the second field of the program call instruction, the target system service routine from the second table. For example, the one or more processors may use the PCI 422 to determine the target system service routine. The PCI 422 may determine the target system service routine based on the EX value of the program call instruction.

In some embodiments, the one or more processors may determine, based on the value of the second field, a target identifier of the requested system service from the plurality of identifiers. The one or more processors may further determine, based on the target identifier, an address of the system service routine for providing the requested system service.

For example, the one or more processors may determine the target identifier of the requested system service based on the EX value and then locates the target system service routine for providing the requested system service.

In some embodiments, the identifiers of the plurality of system services are system call numbers or mapped to the system call numbers. In other words, the one or more processors may determine the target system service routine by using the system call numbers. For example, the one or more processors may locate the target system service routine based on the system call table which comprises a mapping of the system service routines and the system call numbers. In this way, the solution according to the embodiments of the present disclosure can maintain the high compatibility and efficiency achieved by the conventional solutions using the system calls.

Moreover, since the program call instructions are used for invoking the system service routines in the designated target authorized address space in the authorized address space 420, if a program call instruction is issued from a malicious user program, only the designated authorized address space may be destroyed while the security of other authorized address spaces in the authorized address space 420 can be maintained. Thus the solution according to the embodiments of the present disclosure can achieve high security for the operating system.

At block 530, the one or more processors run the target system service routine in the target authorized address space. For example, the one or more processors may use the hardware 430 to perform a sys_open service routine in the target authorized address space.

At block 540, the one or more processors return a result of running the target system service routine to the user program as a response to the request. For example, the one or more processors may return the result to the program call trap handler in the PCI 422. As mentioned above, the result may be an error or a result of execution of the requested system service routine.

In some embodiments, a MVCP instruction and a MVCS instruction proposed with the XMS may be used for transferring data between the user address space and the target authorized address space. The MVCP instruction may be used to move data from the user address space to the target authorized address space. For example, the MVCP instruction may be used to transfer parameters for running the target system service routine to the target authorized address space. The MVCS instruction may be used to move data from the target authorized address space to the user address space. For example, the MVCS instruction may be used to return the result of running the target system service routine to the user address space.

With reference to above FIGS. 4-5, the solution of providing system services according to the embodiments of the present disclosure is described. It is to be noted that these description is only for the purpose of illustration without suggesting any limitations as to the scope of the present disclosure. The embodiments of the present disclosure can be embodied differently. For example, other than the XMS, any suitable technologies which enable a first program in a first address space to provide services synchronously to a second program in a second address space different than the first address space may be implemented to achieve the solution.

Figure 6:
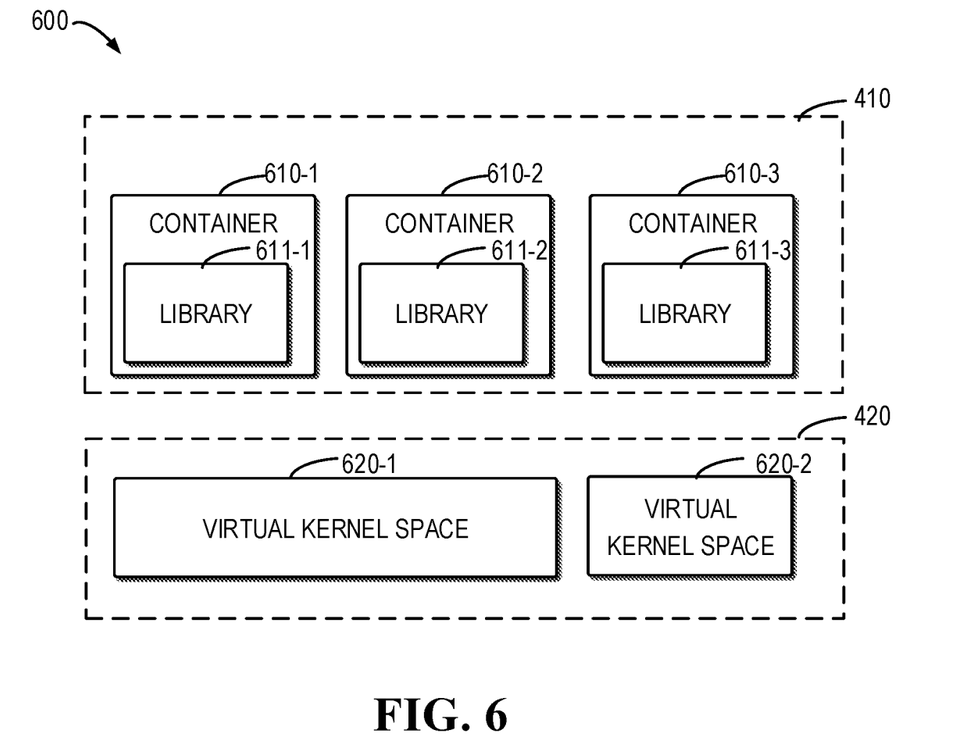
FIG. 6 depicts a flowchart of an example method for providing system services according to embodiments of the present disclosure.

With reference to FIG. 6, a solution of providing system services to different containers is described and according to the solution, resource isolation for multiple containers can be achieved with high security, compatibility and efficiency.

FIG. 6 depicts an example environment for providing system services to different containers according to embodiments of the present disclosure. As shown in FIG. 6, in the environment 600, a plurality of containers may be created in the respective user address spaces in the user address space 410 and corresponding virtual kernel spaces may be created in the authorized address space 420 for providing the system services to the respective containers.

The plurality of containers, such as container 610-1, 610-2 and 610-3 (referred to as container 610 individually or collectively) may run in the respective user address spaces. For example, the container 610-1 may run in a first user address space, the container 610-2 may run in a second user address space, and the container 610-3 may run in a third user address space. The first, second and third user address spaces are different from each other.

The containers 610 may be created with respective application interface code libraries (or libraries for short). For example, the container 610-1 may comprise an application interface code library 611-1, the container 610-2 may comprise an application interface code library 611-2, and the container 610-3 may comprise an application interface code library 611-3.

The application interface code libraries 611-1, 611-2 and 611-3 may be referred to as application interface code library 611 individually or collectively. As discussed above, each application interface code library 611 may comprise a set of program call instructions for invoking in a designated authorized address space, a set of system service routines respectively.

Note that, application interface code libraries 611 in the containers 610 may have different sets of program call instructions. The application interface code libraries 611 may be the same or different from each other. As described herein, if a first set of program call instructions in a first application interface code library and a second set of program call instructions in a second application interface code library correspond to a same authorized address space, i.e., the first fields of the first set of program call instructions and second set of program call instructions have a same value, the first application interface code library can be regarded as the same as the second application interface code library.

Take the libraries shown in FIG. 6 as an example, the application interface code library 611-1 is the same as the application interface code library 611-2, and the application interface code library 611-3 is different from the application interface code library 611-1 and the application interface code library 611-2.

In this case, the requests from the containers 610 may correspond to different authorized address spaces. In other words, different authorized address spaces may provide the system services requested by the containers 610. Thus, the different authorized address spaces may be determined as respective virtual kernel spaces for the containers 610.

For example, since the application interface code library 611-1 is the same as the application interface code library 611-2, the same virtual kernel space 620-1 provides the system services requested by the container 610-1 and 610-2. In contrast, since the application interface code library 611-3 is different from the application interface code libraries 611-1 and 611-2, the virtual kernel space 620-2 which is different from the virtual kernel space 620-1 provides the system services requested by the container 610-3.

In some embodiments, the one or more processors may receive the requests from user programs in the containers 610 running in the user address spaces, respectively. For example, the one or more processors may receive a first request from the container 610-1, receive a second request from the container 610-2 and receive a third request from the container 610-3.

Upon receiving the requests, the one or more processors may determine, based on the program call instructions associated with the requests, the target authorized address spaces respectively. The determined target authorized address spaces may be regarded as the virtual kernel spaces for the containers.

For example, the one or more processors may determine that a same target authorized address space corresponds to the containers 610-1 and 610-2 and may determine the target authorized address space as the virtual kernel space 620-1 for the containers 610-1 and 610-2. The one or more processors may further determine that another target authorized address space corresponds to the container 610-3 and may determine the other target authorized address space as the virtual kernel space 620-2 for the container 610-3.

The one or more processors may further determine the target system service routines provided in the respective target authorized address spaces based on the program call instructions as discussed above. For example, in each virtual kernel space the PCI may determine the respective target system service routine.

Then the one or more processors may run the target system service routines in the target authorized address spaces and the one or more processors may return results of running the target system service routines to the respective containers.

In this case, different authorized address spaces, i.e., virtual kernel spaces in the authorized address space 420 may provide the system services to the respective containers. For example, the virtual kernel space 620-1 provides the system services to the containers 610-1 and 610-2 and the virtual kernel space 620-2 provides the system services to the container 610-3. In other words, the containers 610-1 and 610-2 share the virtual kernel space 620-1 whereas container 610-3 does not share the virtual kernel space 620-1 with the containers 610-1 and 610-2.

Note that, the user programs in the containers 610-1 and 610-2 may request different system services provided in the virtual kernel space 620-1. For example, the user programs may issue the program call instructions with different EX values to request different system services.

In this way, the authorized address space 420 can provide different virtual kernel spaces for different containers so as to achieve the resource isolation. Moreover, by using the program call instructions in the application interface code library, there is no need for the user program to make any changes, nor does it need to change the way of requesting system services. In addition, by using the program call instruction mapped to the system calls, the high efficiency of the conventional solutions using the system calls can be maintained. Therefore, the solution according to the embodiments of the present disclosure can provide system services to different containers with high security, compatibility and efficiency.

According to the embodiments of the present disclosure, a method performed by one or more processors is disclosed. In the method, from a user program in a user address space, a request for a system service is received via a program call instruction of a set of program call instructions in an application interface code library. Based on the program call instruction, a target authorized address space of a plurality of authorized address spaces and a target system service routine for providing the system service in the target authorized address space is determined. A result of running the target system service routine in the target authorized address space is returned to the user program as a response to the request.

In some embodiments, determining the target authorized address space and the target system service routine comprises: determining, by the one or more processors and based on a value of a first field of the program call instruction, the target authorized address space from a first table comprising a mapping of the plurality of authorized address spaces and values of the first field; determining, by the one or more processors and based on the target authorized address space, a second table comprising a mapping of identifiers of a plurality of system services provided in the target authorized address space and values of a second field of the program call instruction; and determining, by the one or more processors and based on a value of the second field of the program call instruction, the target system service routine from the second table.

In some embodiments, determining, based on the value of the second field of the program call instruction, the target system service routine from the second table comprises: determining, by one or more processors and based on the value of the second field of the program call instruction, a target identifier of the system service requested by the user program from the plurality of identifiers; and determining, by one or more processors and based on the target identifier, an address of the system service routine for providing the system service.

In some embodiments, values of the first fields of the set of program call instructions in the application interface code library are the same.

In some embodiments, receiving, from the user program in the user address space, the request for the system service comprises receiving the request from a container with the application interface code library running in the user address space, and wherein the target authorized address space is determined as a virtual kernel space for the container.

In some embodiments, the one or more processors further receive, by one or more processors, another request from another container with another application interface code library running in another user address space; determines, by one or more processors and based on another program call instruction associated with the other request in the other application interface code library, an authorized address space and an system service routine associated with the other request, wherein the authorized address space is different from the target authorized address space; runs, by one or more processors, the system service routine in the authorized address space and wherein the authorized address space is determined as another virtual kernel space for the other container; and returns, by one or more processors, a result of running the system service routine to the other container as a response to the other request.

In some embodiments, the one or more processors further use a MVCP instruction to move data from the user address space to the target authorized address space; and uses a MVCS instruction to move data from the target authorized address space to the user address space.

It can be seen that embodiments of the present disclosure provide a solution for providing system services. This solution allows a target authorized address space to provide the system services requested by the user program in the user address space with high efficiency, compatibility and security. For example, even if the request is issued by a malicious user program, only the target authorized address space would be affected while the security of other authorized address spaces can be maintained. Moreover, by using the program call instruction in the application interface code library to invoke the system service routine, the high efficiency and compatibility can be achieved.

It should be noted that the processing of deployment of a distributed machine learning framework according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, from a user program in a user address space, a request for a system service via a program call instruction of a set of program call instructions in an application interface code library for the user address space;
determining, based on a value of a first field of the program call instruction, an authorized address space from a first table comprising a mapping of the plurality of authorized address spaces and values of the first field;
identifying, based on the authorized address space, a second table comprising a mapping of identifiers of a plurality of system service routines provided in the authorized address space and values of a second field of the program call instruction; and
determining, based on a value of the second field of the program call instruction, a system service routine for providing the system service from the second table;
running the system service routine in the authorized address space; and returning a result of running the system service routine to the user program as a response to the request.

2. The method of claim 1, wherein determining the system service routine from the second table comprises:
 determining, based on the value of the second field of the program call instruction, an identifier of the system service requested by the user program from the plurality of identifiers; and
 determining, based on the identifier, an address of the system service routine for providing the system service.

3. The method of claim 2, wherein the identifiers of the plurality of system services are system call numbers or mapped to the system call numbers.

4. The method of claim 1, wherein the value of the first field of the program call instruction and the value of the first field in the first table are the same.

5. The method of claim 1, wherein receiving the request for the system service comprises:
 receiving the request from a container comprising the application interface code library running in the user address space;
 wherein the authorized address space is determined as a virtual kernel space for the container.

6. The method of claim 5, further comprising:
 receiving another request from another container comprising another application interface code library running in another user address space;
 determining, based on another program call instruction associated with the other request in the other application interface code library, another authorized address space and another system service routine associated with the other request, wherein the other authorized address space is different from the authorized address space;
 running the other system service routine in the other authorized address space and wherein the other authorized address space is determined as another virtual kernel space for the other container; and
 returning a result of running the other system service routine to the other container as a response to the other request.

7. The method of claim 1, further comprising:
 using a MVCP instruction to move data from the user address space to the authorized address space; and
 using a MVCS instruction to move data from the authorized address space to the user address space.

8. A system comprising:
 a processing unit; and
 a memory coupled to the processing unit and storing instructions thereon, the instructions, when executed by the processing unit, performing actions comprising:
  receiving, from a user program in a user address space, a request for a system service via a program call instruction of a set of program call instructions in an application interface code library for the user address space;
  determining, based on a value of a first field of the program call instruction, an authorized address space from a first table comprising a mapping of the plurality of authorized address spaces and values of the first field;
  identifying, based on the authorized address space, a second table comprising a mapping of identifiers of a plurality of system service routines provided in the authorized address space and values of a second field of the program call instruction; and
  determining, based on a value of the second field of the program call instruction, a system service routine for providing the system service from the second table;
  running the system service routine in the authorized address space; and
  returning a result of running the system service routine to the user program as a response to the request.

9. The system of claim 8, wherein determining the system service routine from the second table comprises:
 determining, based on the value of the second field of the program call instruction, an identifier of the system service requested by the user program from the plurality of identifiers; and
 determining, based on the identifier, an address of the system service routine for providing the system service.

10. The system of claim 9, wherein the identifiers of the plurality of system services are system call numbers or mapped to the system call numbers.

11. The system of claim 8, wherein the value of the first field of the program call instruction and the value of the first field in the first table are the same.

12. The system of claim 8, wherein receiving the request for the system service comprises:
 receiving the request from a container comprising the application interface code library running in the user address space;
 wherein the authorized address space is determined as a virtual kernel space for the container.

13. The system of claim 12, wherein the actions further comprise:
 receiving another request from another container comprising another application interface code library running in another user address space;
 determining, based on another program call instruction associated with the other request in the other application interface code library, another authorized address space and another system service routine associated with the other request, wherein the other authorized address space is different from the authorized address space;
 running the other system service routine in the other authorized address space and wherein the other authorized address space is determined as another virtual kernel space for the other container; and
 returning a result of running the other system service routine to the other container as a response to the other request.

14. The system of claim 8, wherein the actions further comprise:
 using a MVCP instruction to move data from the user address space to the authorized address space; and
 using a MVCS instruction to move data from the authorized address space to the user address space.

15. A computer program product being tangibly stored on a non-transient machine-readable medium and comprising machine-executable instructions, the instructions, when executed on a device, causing the device to perform actions comprising:
 receiving, from a user program in a user address space, a request for a system service via a program call instruction of a set of program call instructions in an application interface code library for the user address space;
 determining, based on a value of a first field of the program call instruction, an authorized address space from a first table comprising a mapping of the plurality of authorized address spaces and values of the first field;

identifying, based on the authorized address space, a second table comprising a mapping of identifiers of a plurality of system service routines provided in the authorized address space and values of a second field of the program call instruction; and determining, based on a value of the second field of the program call instruction, a system service routine for providing the system service from the second table;

running the system service routine in the authorized address space; and returning a result of running the system service routine to the user program as a response to the request.

16. The computer program product of claim 15, wherein determining the system service routine from the second table comprises:

determining, based on the value of the second field of the program call instruction, an identifier of the system service requested by the user program from the plurality of identifiers; and determining, based on the identifier, an address of the system service routine for providing the system service.

17. The computer program product of claim 16, wherein the identifiers of the plurality of system services are system call numbers or mapped to the system call numbers.

18. The computer program product of claim 15, wherein receiving the request for the system service comprises:

receiving the request from a container comprising the application interface code library running in the user address space;

wherein the authorized address space is determined as a virtual kernel space for the container.

19. The computer program product of claim 18, further causing the device to perform actions comprising:

receiving another request from another container comprising another application interface code library running in another user address space;

determining, based on another program call instruction associated with the other request in the other application interface code library, another authorized address space and another system service routine associated with the other request, wherein the other authorized address space is different from the authorized address space;

running the other system service routine in the other authorized address space and wherein the other authorized address space is determined as another virtual kernel space for the other container; and returning a result of running the other system service routine to the other container as a response to the other request.

20. The computer program product of claim 15, further causing the device to perform actions comprising:

using a MVCP instruction to move data from the user address space to the authorized address space; and using a MVCS instruction to move data from the authorized address space to the user address space.

* * * * *